(12) United States Patent
Connolly et al.

(10) Patent No.: US 9,050,750 B2
(45) Date of Patent: Jun. 9, 2015

(54) PROCESS FOR MAKING A STRETCH-BLOW MOULDED CONTAINER HAVING AN INTEGRALLY MOULDED HANDLE

(75) Inventors: William John Cleveland Connolly, Windlesham (GB); Patrick Jean-Francois Etesse, Brussels (BE); Christian Gerhard Friedrich Gerlach, St Gilles (BE); Christopher Lamb, Ohain (BE)

(73) Assignee: The Procter & Gamble Company, Cincinnati, OH (US)

( * ) Notice: Subject to any disclaimer, the term of this patent is extended or adjusted under 35 U.S.C. 154(b) by 759 days.

(21) Appl. No.: 12/406,523

(22) Filed: Mar. 18, 2009

(65) Prior Publication Data
US 2009/0236776 A1    Sep. 24, 2009

(30) Foreign Application Priority Data
Mar. 18, 2008    (EP) .................................... 08152903

(51) Int. Cl.
*B29C 49/00*    (2006.01)
*B29C 49/48*    (2006.01)
(Continued)

(52) U.S. Cl.
CPC ............ *B29C 49/4802* (2013.01); *B29C 49/06* (2013.01); *B29C 49/12* (2013.01); *B29C 49/6481* (2013.01); *B29C 2049/4807* (2013.01);
(Continued)

(58) Field of Classification Search
USPC ......................... 264/531, 534, 542
See application file for complete search history.

(56) References Cited

U.S. PATENT DOCUMENTS 5,066,222 A * 11/1991 Roos et al. ................... 432/5
5,149,485 A * 9/1992 Belcher ......................... 264/532
(Continued)

FOREIGN PATENT DOCUMENTS

EP    0 346 518 A1    12/1989
JP    63-189224 A    8/1988
(Continued)

OTHER PUBLICATIONS

International Search Report mailed Jun. 24, 2009—7 pages.
EP2103413 Opposition dated Dec. 9, 2014.

*Primary Examiner* — Yogendra Gupta
*Assistant Examiner* — H. L. K.
(74) *Attorney, Agent, or Firm* — Gary J. Foose

(57) ABSTRACT

The present invention relates to a process for making a container having an integral handle, comprising the steps of:
  a) providing a preform (6) in a mold cavity (1);
  b) stretch-blow molding the preform (6) to form an intermediate container (8) which comprises at least one, preferably two, convex bubble(s) (9);
  c) deforming the or each convex bubble (9) by means of an inwardly moving plug (5) to form one or more concave gripping region(s), while maintaining the pressure within the intermediate container (8) above 1 bar and while the temperature of the material in the gripping region of the intermediate container is maintained at a temperature between the glass transition temperature, $T_g$, and the melt temperature, $T_m$;
  d) releasing excess pressure within the container, preferably prior to withdrawing the plug (5) from within the container; and
  e) ejecting the finished container from the mold cavity (1, 3).

14 Claims, 5 Drawing Sheets

(51) Int. Cl.
  *B29C 49/06* (2006.01)
  *B29C 49/12* (2006.01)
  *B29C 49/64* (2006.01)
  *B29K 23/00* (2006.01)
  *B29K 25/00* (2006.01)
  *B29K 27/06* (2006.01)
  *B29K 67/00* (2006.01)
  *B29L 31/46* (2006.01)

(52) U.S. Cl.
  CPC .... *B29C 2049/4812* (2013.01); *B29K 2023/06* (2013.01); *B29K 2023/12* (2013.01); *B29K 2025/00* (2013.01); *B29K 2027/06* (2013.01); *B29K 2067/00* (2013.01); *B29K 2067/046* (2013.01); *B29L 2031/463* (2013.01)

(56) References Cited

U.S. PATENT DOCUMENTS

| | | | | |
|---|---|---|---|---|
| 5,202,078 A | * | 4/1993 | Moore | 264/527 |
| 7,153,455 B2 | * | 12/2006 | Belcher | 264/37.31 |
| 2007/0145646 A1 | * | 6/2007 | Cho | 264/529 |
| 2007/0235905 A1 | * | 10/2007 | Trude et al. | 264/523 |
| 2011/0018177 A1 | * | 1/2011 | Goss et al. | 264/531 |

FOREIGN PATENT DOCUMENTS

| | | | | |
|---|---|---|---|---|
| WO | WO 00/59790 | | 10/2000 | |
| WO | WO 01/87573 A1 | | 11/2001 | |
| WO | WO 0187573 A1 | * | 11/2001 | ............. B29C 49/18 |
| WO | WO 2006/113428 A2 | | 10/2006 | |
| WO | WO 2007128451 A1 | * | 11/2007 | ............. B65D 1/02 |

* cited by examiner

Fig. 3 (ii)

Fig. 3 (iii)

Fig. 3 (iv)

PROCESS FOR MAKING A STRETCH-BLOW MOULDED CONTAINER HAVING AN INTEGRALLY MOULDED HANDLE

The present invention relates to a process for making a stretch-blow moulded container having an integrally moulded handle, preferably having a handle with good ergonomics.

The formation of integral handles via the stretch-blow moulding process is highly desirable and the art contains a number of attempts to solve the inherent problems which have not proved successful. An integrally moulded handle is generally less expensive than a separate, e.g. clip-on, handle. Previously disclosed approaches to provide an integral handle typically require the formation of a pair of opposing depressions or cavities in the body of the bottle that form the structural basis of the handle. These depressions can either then be welded together and the central section, encompassed by the weld, can be removed such as to form a completely open space through which the fingers and/or thumb can be inserted (a 'through' handle), or, alternatively, left to simply form a grip. If the grip is formed to be sufficiently wide and deep so that a hand can close on the grip without having the tip of the fingers touch the bottom of the recess, then ergonomic studies have shown the resulting grip functionality to be as good as that of a through handle.

One of the problems associated with the prior art is that the distribution of material in these depressions is uneven. Due to the need for a significant difference in stretch from the original preform to different sections of these wells, irregular wall thicknesses are formed, resulting in adverse mechanical and aesthetic properties.

One approach, as detailed in EP-A-0 346 518, published on Dec. 20, 1989, requires the use of moving sections of the mould to compress the expanding preform and form these deep wells during the blowing process. This process, however, results in two problems. Firstly, this process requires significant levels of stretching of the material after contact with the mould. This results in highly irregular wall thickness in the handle area and regular failure of the material under stress. In addition, the complexity that is required to move mould sections against pressure in excess of 20 bars required to blow a bottle results in moulds which are expensive and difficult to maintain.

An alternative approach as detailed in WO-A-2006/113428, published on Oct. $26^{th}$ 2006, is to produce an intermediate container with a convex section which can be mechanically deformed inwardly to form the concave grip section. This process enables the designer to produce more even stretch ratios and hence more even wall thicknesses. However, the inversion of this section results in significant deformation of the area around the handle, creating aesthetic defects. These defects are moreover very difficult to control, as the exact nature of the deformation will be highly dependant on very small variations in wall thickness. WO-A-2006/113428 describes multiple articulation zones in order to minimize the issue to allow a clean inversion of the grip geometry (from convex to concave). This results in a very restrictive design geometry and cannot eliminate residual stresses in the plastic sheets forming the grip resulting in undesirable wrinkles and poor ergonomics.

It is an object of the present invention to provide a process to create a deep, concave grip which provides an ergonomic handle.

SUMMARY OF THE INVENTION

The present invention relates to a process for making a container having an integral handle, comprising the steps of:

a) providing a preform (6) in a mould cavity (1);
b) stretch-blow moulding the preform (6) to form an intermediate container (8) which comprises at least one, preferably two, convex bubble(s) (9);
c) deforming the or each convex bubble (9) by means of an inwardly moving plug (5) to form one or more concave gripping region(s), whilst maintaining the pressure within the intermediate container (8) above 1 bar and whilst the temperature of the material in the gripping region of the intermediate container is maintained at a temperature between the glass transition temperature, $T_g$, and the melt temperature, $T_m$;
d) releasing excess pressure within the container, preferably prior to withdrawing the plug (5) from within the container; and
e) ejecting the finished container from the mould cavity (1, 3).

DETAILED DESCRIPTION OF THE INVENTION

Figure 1:
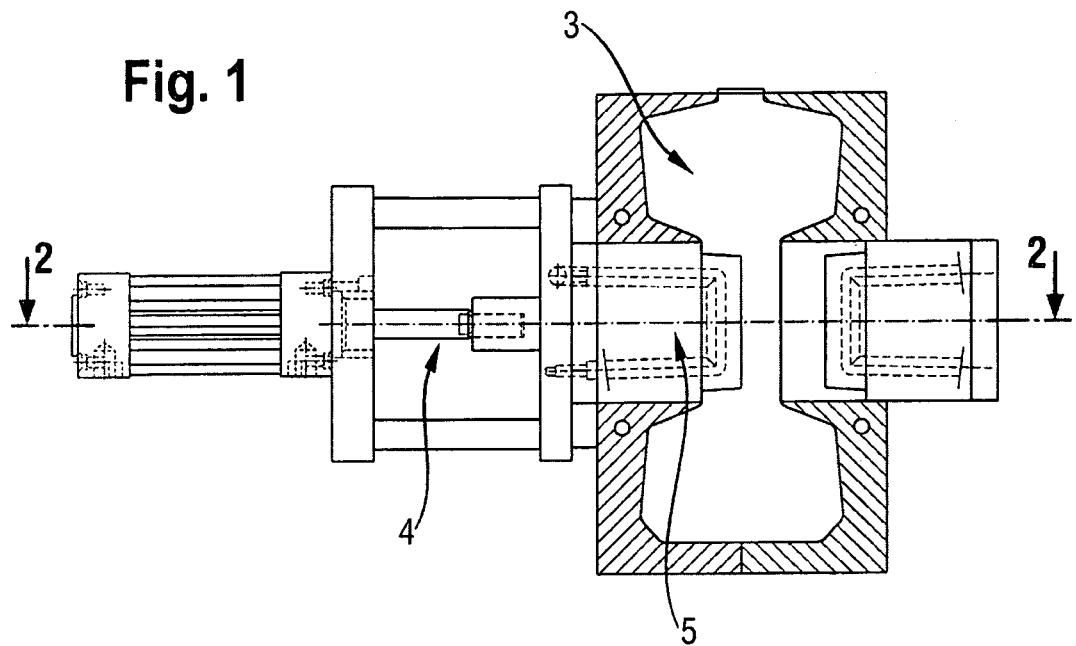
FIG. 1 shows a vertical cross-section through a thermoforming apparatus useful for carrying out the process of the present invention.

By "stretch-blow moulding", what is meant herein is the process in which preforms are heated above their glass transition temperature, and then blown in moulds using high pressure air to form hollow bodies, such as containers, bottles. Usually the preform is stretched with a core rod as part of the process.

By "preform" what is meant herein is a moulded form which is produced prior to expansion to form the finished object. A preform is necessarily somewhat smaller than the finished object. A preform is generally produced by, for example injection moulding, at an elevated temperature in excess of the melt temperature.

The term "thermoforming" is used herein in its broad sense of deformation of a material at temperature above its glass transition/brittle temperature. Thermoforming is described in "The Wiley Encyclopedia of Packaging Technology", Edited by Brody, A. L. and Marsh, K. S., John Wiley & Sons, Inc., $2^{nd}$ Edition, 1997, pages 914 to 921, which is incorporated herein by reference.

Thermoforming is one of many manufacturing processes that converts plastic resin into usable everyday products. Speed and cost efficiency are the highlighted qualities that thermoforming offers which lead the way for the process becoming so important in industry today. The basic concept of thermoforming is quite simple. A pre-manufactured thermoplastic sheet is heated until it becomes soft and pliable. It is then forced against the contours of a mould until it cools to its original state. Once it has cooled it is removed from the mould while still maintaining the shape of the mould. Thermoforming is a broad term; there are many different types of thermoforming processes. For deep thermoforming, bubble plug-assist forming is an important process. The advantage of this forming technique is that it improves material distribution because of its pre-stretching procedure. By this process, it is possible to control the thickness of the formed article as the sheet is stretched to guarantee an even thickness of walls. Once the sheet has been placed in the frame and heated, controlled air pressure creates a bubble. This bubble stretches the material to a predetermined level. The male plug assist is then lowered, forcing the stretched stock down into the cavity. The male plug is normally heated to avoid chilling the plastics prematurely. The plug is made as large as possible so the plastic is stretched close to the final shape of the finished product. The female mould must be vented to allow trapped air to escape from between the plastics and the mould.

Thermoforming can take place in two dimensions, whereby a surface is deformed, or in three dimensions where, in addition to two dimensional deformation, a change of the thickness also occurs.

The present invention uses the bubble plug-assist thermoforming technique to address the problems of forming an integrally moulded handle on a stretch-blow moulded container.

The term "deep grip" is used herein to denote a blind handle, that is to say a gripping feature which permits the user's thumb and fingers to wrap around a handle, but which does not allow the fingers to pass completely behind and through the handle. A "through" type of handle can be achieved by cutting away part or all of the web of material which is formed between the handle and the body of the container. The deep grip handle and the through handle from which the web has been cut-away are both within the scope of the present invention, although the deep grip is preferred.

Preferred plastic resin materials for use in the present invention are thermoplastic materials, and most commonly polyesters such as polyethylene terephthalate (PET). Other materials suitable for use in the present invention are polypropylene (PP), polyethylene (PE), polystyrene (PS), polyvinyl chloride (PVC) and polylactic acid (PLA). Particularly preferred resin material is heat-set polyethylene terephthalate.

As in all polymer processes the temperature history plays an important factor in the deformation behaviour. For amorphous polymers, such as polystyrene, the forming temperature is generally above the polymer's glass transition temperature ($T_g$). The glass transition temperature is defined as the temperature below which the polymer behaves like a brittle, glassy solid and above which the polymer behaves like a rubber and is easily deformable. For semi-crystalline polymers, the amorphous region responds to temperature just like an amorphous polymer described above, but the crystalline region that is composed of crystallite structure requires more heat energy to unravel/shear the crystallite molecules and enable large deformation as needed for the formation of the deep grip. The percentage of crystallinity and the rate of crystallization depend strongly on the crystallization temperature, the time at that temperature, and the degree of molecular orientation during crystallization. Typically, semi-crystalline materials are deformed close to the melt temperature $T_m$. The melt temperature is the temperature where all crystallites are melted and the polymer is behaving as a fluid. Another characteristic temperature for semi-crystalline polymers is the re-crystallisation temperature $T_c$. The re-crystallisation temperature is defined as the temperature at which an un-oriented polymer when cooled down from the melt is showing significant crystal growth within a specific period of time, typically a few minutes. As crystal growth is slower at lower temperatures, if the specified time period is extended, the $T_c$ effectively drops.

Glass transition temperature, re-crystallisation temperature and melt temperature may be conveniently measured with reference to ASTM D3418.

As illustrative example of above, an isotactic random co-polymer polypropylene grade typically used for reheat stretch-blow moulding of containers shows a 1-3 minutes crystallization inhibition time before crystal growth initiates at 60-80° C. Hence, if the time period for crystallisation is set at 1 minute, 60-80° C. is effectively below $T_c$ even when the polymer was stretched biaxially at temperatures close to the melt temperature. PET is known to show stress-induced crystallization during stretch-blow moulding up to a crystallinity of 20-25%. If the polymer is then cooled down rapidly to temperatures below $T_g$ no additional crystallinity will develop. But if kept at temperatures above 90° C. ($T_c$) the polymer will crystallize up to 35% within minutes. At temperatures between $T_g$ and $T_c$ there is little or no further crystal growth within the first 1-2 minutes which is of advantage for the processing described within.

| Typical Temperatures | PET | PP | PS |
|---|---|---|---|
| Glass transition temperature, $T_g$ | 81° C. | −10° C. | 82° C. |
| Recrystallisation temperature, $T_c$ (for time <1 min) | 90° C. | 110° C. | Not applicable (fully amorphous) |
| Melt temperature, $T_m$ | 265° C. | 170° C. | 240° C. |

In a preferred embodiment of the present invention a heated preform is inserted into a blow mould cavity. This blow mould comprises two recesses in the outer walls of the cavity to create the pre-stretched bubble that will later be thermoformed by the plug. The container is then stretch-blown in such a way that the pre-stretched bubble is cooled as little as possible. This ensures that minimal or no additional heat is needed to be applied to the bubble in the second thermoforming process step.

The invention will now be illustrated in more detail with reference to the drawings.

FIG. 1 is a vertical cross section of a bubble plug-assist thermoforming cavity (3) used in the invention.

Figure 2:
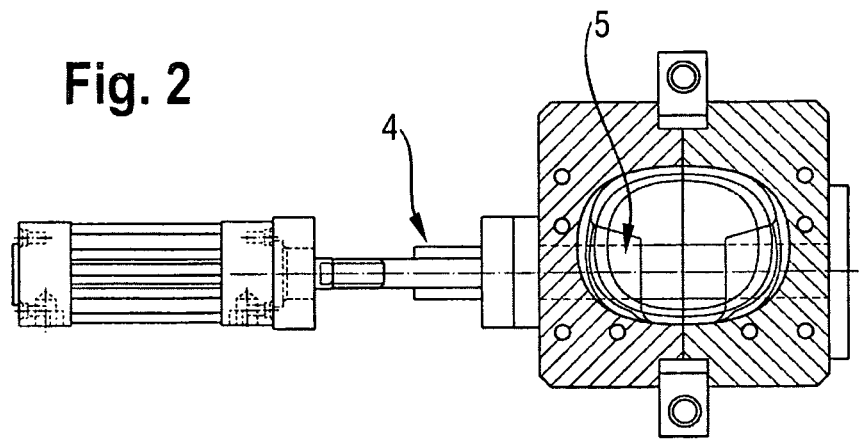
FIG. 2 shows a horizontal cross-section through the thermoforming apparatus shown in FIG. 1, along the centre line 2-2.

FIG. 2 is a horizontal cross section of the bubble plug-assist thermoforming cavity (3) used in the invention. The plug (5) is driven by pneumatic pistons (4). Not shown in the figure are cooling/heating circuits integrated into the cavity and separate cooling/heating circuits integrated into the plugs. This cavity can either be integral to the blow mould or be a separate cavity.

Figure 3:
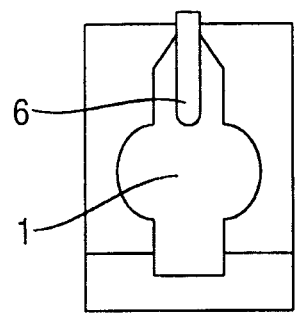
FIG. 3 illustrates diagrammatically the steps according to the process of the present invention.
Figure 3:
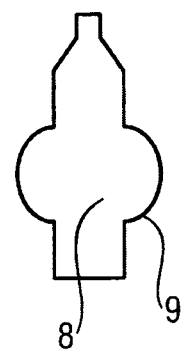
Figure 3:
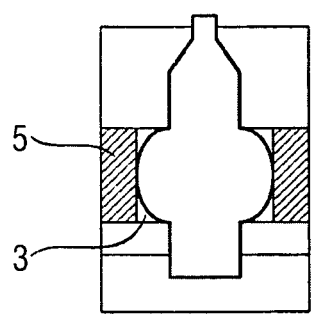
Figure 3:
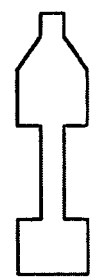

The process of the present invention can be well understood with reference to FIG. 3 showing in diagrammatic form, the steps of:
 a) providing a preform (6), in a mould cavity (1), FIG. 3(i);
 b) stretch-blow moulding the preform (6) to form an intermediate container (8) which comprises at least one, preferably two, convex bubble(s) (9), FIG. 3(ii); optionally transferring the intermediate container into a separate, thermoforming cavity (3), and optionally reheating the intermediate container, FIG. 3(ii);
 c) deforming the or each convex bubble (9) by means of an inwardly moving plug (5) to form one or more concave gripping region(s), whilst maintaining the pressure within the intermediate container (8) above 1 bar and whilst the temperature of the material in the gripping region of the intermediate container is maintained at a temperature between the glass transition temperature, $T_g$, and the melt temperature, $T_m$, FIG. 3(*iii*);

d) releasing excess pressure within the container, preferably prior to withdrawing the plug (5) from within the container; and e) ejecting the finished container from the mould cavity (1, 3), FIG. 3(*iv*).

The step shown in FIG. 3(*i*) can be done via injection stretch-blow moulding or reheat stretch-blow moulding where in the latter injection and stretch-blow moulding is done on two separate machines.

The step shown in FIG. 3(*ii*) shows the option of providing the thermoform cavity separately from the blow cavity. The container may be re-heated during this transfer in the case the pre-stretched bubble has cooled down too much during the blowing step and/or the transfer to the thermoforming cavity.

In a variation, the step shown in FIG. 3(*ii*) can be eliminated if steps in FIG. 3(*i*) and FIG. 3(*iii*) happen in the same cavity. This has the advantage that the time between blow moulding and thermoforming is minimized and that the tolerances on the container specifically around the deep grip are tighter as there is no relative movement of the container versus the plug. The integration in one cavity complicates the construction of the blow mould as the blow mould needs to have moveable plug(s), the blow moulding machine needs to be adapted to control the thermoforming step and the total cycle time increases as the movement of the plug adds to the blowing cycle.

In the step shown in FIG. 3(*iii*), the bottle is pressurized to enable a positive location of the bottle in the cavity, and a plug-assist piston is forced into the pre-stretched bubble to thermoform the desired deep grip recess. As the male plug fully engages, an over pressure of from about 1 to about 5 bar is applied inside the container in order to effectively act as the female mould portion of the conventional pressure-bubble/plug-assist thermoforming process. This also ensures that the non deep grip portion of the container is not deformed as the male plug thermoforms the deep grip portion. Once the male plug is fully engaged, plastic is conformed to the plug and the final deep grip geometry is achieved.

In the step shown in FIG. 3(*iv*), the pressure is preferably first released, and then the plug-assist piston retracted, and the bottle ejected.

Preferred characteristics of the deep grip forming process shown in FIGS. 3(*ii*) to 3(*iv*) are as follows:

1. The deep grip is formed before thermal crystal growth has started. Ideally the material is in an amorphous state where it is easily deformable;

2. The surface area of the pre-stretched bubble is no larger than the surface area of the deep grip;

3. The plug that forms the deep grip is an identical male shape of the final deep grip; and/or 4. The container is ejected at a temperature where mechanical deformation is hindered (typically below $T_g$) and material crystallizes in the final desired shape.

In point 2), it is not essential that the deep grip is a mirror shape of the pre-stretched bubble. In fact, it can be of advantage if the surface area of the pre-stretch bubble is somewhat smaller than the surface area of the deep grip (1-50%). In case the surface area of the pre-stretched bubble is smaller than the surface area of the deep grip there is a three dimensional deformation of the pre-stretch bubble to form the deep grip. The resulting wall thickness reduction of the pre-stretch bubble to form the deep grip can be of advantage to give a good calibration of the deep grip detail. It has been found that the surface area of the pre-stretched bubble should never be larger than the area of the deep grip, as the "excessive" surface will form folds and wrinkles that have negative impact on aesthetics and performance.

In point 3) it is has been found that plugs that are not a male shape of the final deep grip cause undesired wrinkles and folds in the deep grip that have a negative impact on aesthetics and performance.

The following table captures particularly preferred process settings in terms of temperature, desired microstructure in desired bubble/deep grip geometry

| Step | Temperature history | Desired microstructure | Pre-stretch bubble/deep grip geometry |
|---|---|---|---|
| a) Injection | $T_m$ | Amorphous/semi-crystalline | Not applicable |
| b) (Reheat) stretch-blow mould | Above $T_c$ for the timescale, below Tm and typically within less than 1 minute | Amorphous | Pre-stretched bubble of same or less surface area |
| c) Thermoforming deep grip | Above $T_g$ and below $T_c$, and within few minutes, typically less than 2 minutes | No significant crystal growth - ideally amorphous or only stress crystalisation. | Deep grip formed by plug with desired final shape |
| e) Eject container | Significantly below $T_c$ | Semi-crystalline, importantly crystal growth happening in the final shape | No further shape change desired |

It can be advantageous to include venting holes in the thermoforming plug that are designed similar to venting holes conventionally used in blow moulds. When the pre-stretched bubble gets thermoformed to form the concave gripping region, the surface of the material will conform closely to the outer profile of the thermoforming plug, and the air between the bubble and the plug can escape through the venting holes. Furthermore, when the thermoforming plug is withdrawn just prior to the container ejection, the venting holes prevent a vacuum from building up between the concave gripping region and the plug that could lead to a distortion of the deep grip.

The deep grip should be ergonomically shaped to help the consumer to hold the container and pour product from the container. Anthropometric studies indicate that the minimum grip diameter of the circle formed by the thumb and forefinger when enclosing a cone (in accordance with DIN33402) for women aged 20-59 is 34 mm, which corresponds to an inside perimeter of 107 mm. Accordingly, the deep grip should provide at least this amount of grippable developed length to ensure ergonomic functionality equal to that of a through handle.

Figure 4:
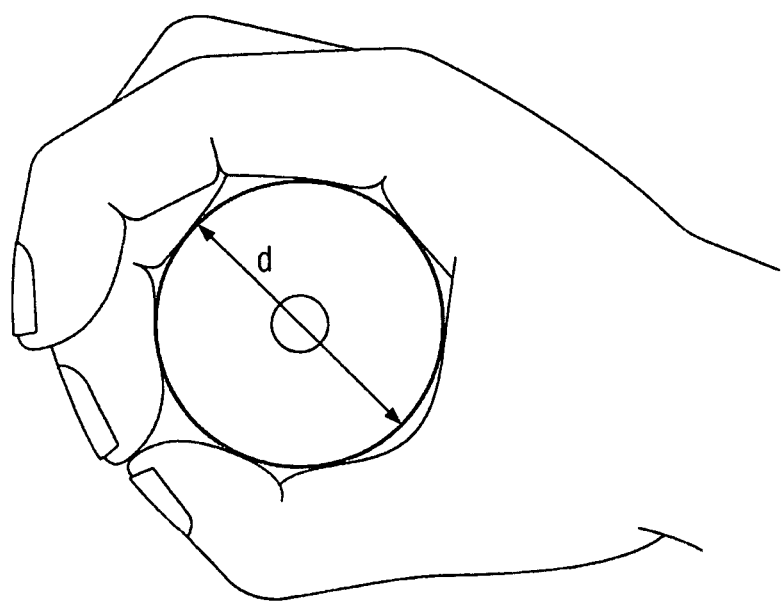
FIG. 4 shows the grip diameter measured in accordance with DIN33402.

FIG. 4 shows the grip diameter, d, defined as the minimum diameter of the circle made by the thumb and finger when enclosing a cone (in accordance with DIN 33402).

Figure 5:
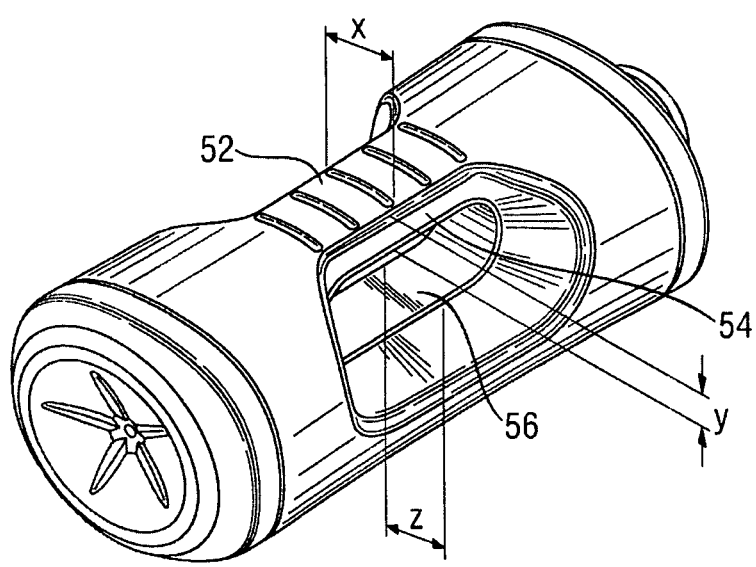
FIG. 5 shows a perspective view of a bottle with an integral handle, made according to the present invention.

FIG. 5 is a drawing of the finished container with key deep grip functional dimensions: deep grip palm rest, x, 52; deep grip finger rest, y, 54; deep grip recess depth, z, 56.

The deep grip should preferably be as deep as possible, the principle limitation being the footprint of the bottle, but preferably no less than required to generate a developed length of 107 mm. In the case of a symmetrical deep grip design as shown in FIG. 5, then x+2y+2z should preferably be no less than 107 mm. The depth of each deep grip recess (z) should preferably be greater than 20 mm (i.e., z>20 mm). In a preferred embodiment the deep grip is formed by two opposing concave gripping regions, the respective bases of which are in mutual contact.

The palm rest of the deep grip (x) should preferably be sufficiently large so that the bottle can rest intuitively against the palm of the hand and opens the hand sufficiently wide that the fingers do not touch in the bottom of the deep grip recess. It has been found by ergonomic studies that a palm rest width of greater than 30 mm (i.e. x>30 mm) is the minimum required to provide comfortable handling at parity with that of a through handle.

Opposing deep grip halves do not need to be symmetrical in terms of depth and shape as the asymmetry can improve the ergonomic performance of the container.

When the respective bases of the concave gripping regions are in mutual contact it can also be advantageous to provide means for interlocking the opposing concave gripping regions against each other such as to substantially eliminate any relative movement when gripped. An example of one such means is a "peg and pin" where both concave gripping regions meet. The peg and pin are aligned and interlocked during the thermoforming step. In one embodiment, the peg and pin are formed concavely in the pre-stretched bubble and then formed into their final convex shape during thermoforming the deep grip. In another embodiment, the peg and pin are thermoformed out of the pre-stretch bubble wall thickness during the deep grip thermoforming step. This avoids the need to weld opposing concave gripping regions. Such welds are undesirable because they provide weak spots which easily fail, especially under drop load.

The advantages of this invention over previous art are that formation of the final deep grip area is produced with material that is already substantially stretched to its correct ratios. This prevents the requirement of significant stretching against a cool mould wall as in EP-A-0 346 518. The plugs also only need to move against a relatively low pressure (typically less than 5 bars), greatly simplifying the mould construction. In addition, as a deep grip forming is not occurring in an intermediate container that has had significant intimate contact with cool mould walls as in the process outlined in WO-A2006/113428, the material will be much less stressed on deep grip forming, resulting in lower deformation at the deep grip area.

EXAMPLES

Example 1

Using polypropylene excellent results are obtained by stretch-blow moulding the container at 125° C. The container is transferred from the blow cavity to the thermoforming cavity within two minutes without additionally pre-heating the container whilst the pre-stretched bubble is at a temperature of between 60 and 80° C. The container is pressurized in the thermoforming cavity to two bar and then the deep grip is thermoformed by use of pneumatic cylinders. Optimal deep grip quality is obtained with a plug matching the final deep grip shape. The container is vented and then ejected at a temperature of below 60° C.

In this example the polypropylene resin selected is Basell Stretchene® 1903. The conditions for the transfer of container from blow cavity to thermoforming cavity are chosen so that the material is essentially still amorphous before and during the deep grip forming step. In the case that significant crystal growth is initiated prior to thermoforming significantly higher forces are required to create the deep grip and the risk of aesthetic defects is higher.

Figure 6:
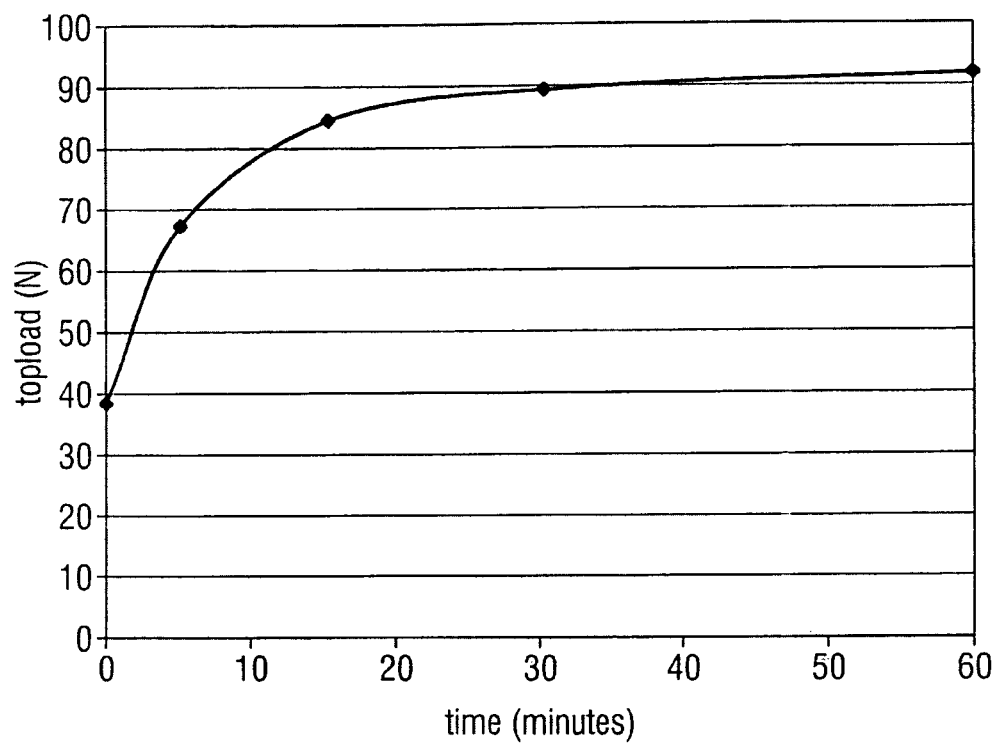
FIG. 6 is a graph showing the development of topload with time of the bottle shown in FIG. 5 made from polypropylene.

FIG. 6 shows the development of topload with time after stretch-blow moulding the polypropylene container. The increase of topload correlates directly with the development of crystallinity in polypropylene containers as can be found in literature. It can be seen that the topload is extremely low in the first 2 minutes because the crystal growth has not started for the specific Ziegler-Natter isotactic random copolymer used here (Basell Stretchene® 1903).

It can be advantageous to heat the thermoforming plug to reduce the crystal nucleation rate and keep the material warm enough to enable a material deformation through the thickness of the pre-stretched bubble without inducing stresses. In the latter, there is true three dimensional deformation of the pre-stretched bubble into the deep grip and ensure best calibration of the deep grip shape by the plug.

Example 2

Using PET excellent results are obtained by stretch-blow moulding the container at 90-95° C. The container is rapidly transferred from blow cavity to the thermoforming cavity within less than 60 seconds (preferably less than 30 seconds) while the pre-stretched bubble is still at a temperature between 80 and 90° C. The container is pressurized in the thermoforming cavity to 1-5 bar and then the deep grip is thermoformed by use of pneumatic cylinders. Optimal quality is obtained with a plug matching the final deep grip shape. The container is vented and then ejected at a temperature of below 80° C.

In this example the PET resin selected is Equipolymer® C93. The conditions for the transfer of container from blow cavity to thermoforming cavity are chosen so that the material is essentially still amorphous before and during the deep grip forming step. As PET is stress-induced crystallising during the stretch-blow moulding one cannot avoid an initial crystallinity up to 25%, but the temperature/time profile was carefully chosen to eliminate any additional thermal crystal growth (i.e., at temperatures below $T_c$ as undrawn PET crystallizes at temperatures above $T_c$) and to be warm enough deforming rubber-like (i.e., at temperatures above $T_g$).

For PET it can be of advantage to heat the blow cavity up to 140° C. to achieve the desired temperature of the blown container between 80-90° C. at the thermoforming step. Preferably, only the mould section that forms the pre-stretch bubble is being heated so that this section stays at 80-90° C. while the rest of the container mould is cooled and therefore resists better any undesired deformation during the deep grip formation. It has been shown that unmoulding a PET container from a cold 10-20° C. blow cavity leads to an undesired container temperature of 45-55° C. prior to thermoforming which then requires higher pressures inside the container to avoid undesired deformation outside the deep grip area, higher forces on the plug to thermoform the pre-stretched bubble, and leads to undesired folds and wrinkles in the final article as internal stresses are build up during thermoforming.

It can be of a further advantage, especially for PET, to combine blow cavity and thermoform cavity in order to eliminate any delay between blowing and thermoforming the deep grip and keep the temperature of the pre-stretched bubble as close to the desired 80-90° C. such that thermoforming happens before significant crystal growth has occurred.

In comparison to polypropylene, PET will show less through thickness deformation during deep grip forming and therefore the benefit of a heated plug is considered of less significance. Instead, it can be advantageous, especially for PET, to cool the thermoforming plug to freeze the final deep grip shape ensuring good calibration in the deep grip forming step and to minimize post-mould shrinkage in the article.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

What is claimed is:

1. A process for making a container having an integral handle, comprising the steps of:
    a) providing a preform (6) in a mould cavity (1);
    b) stretch-blow moulding the preform (6) to form an intermediate container (8) which comprises a convex bubble (9) extending outwardly from said intermediate container, said convex bubble (9) having a surface area;
    c) deforming said convex bubble (9) by means of an inwardly moving plug (5) to form a gripping region having an area, whilst maintaining the pressure within the intermediate container (8) above 1 bar and whilst the temperature of the material in the gripping region of the intermediate container is maintained at a temperature between the glass transition temperature, $T_g$, and the melt temperature, $T_m$, wherein said surface area of said convex bubble (9) is less than said area of said concave gripping region;
    d) releasing excess pressure within the container; and
    e) ejecting the finished container from the mould cavity (1, 3).

2. A process according to claim 1 wherein step b) comprises stretch-blow moulding the preform (6) to form an intermediate container (8) which comprises two convex bubbles (9).

3. The process according to claim 1 wherein step d) comprises releasing excess pressure within the container prior to withdrawing the plug (5) from within the container.

4. The process according to claim 1 wherein throughout step c) the material in the gripping region of the intermediate container is in an amorphous state.

5. The process according to claim 1 wherein in step c) the temperature of the material in the gripping region of the intermediate container is maintained at a temperature between the glass transition temperature, $T_g$, and the re-crystallisation temperature, $T_c$.

6. The process according to claim 5 wherein throughout step c) the material in the gripping region of the intermediate container is in an amorphous state.

7. The process according to claim 1 wherein step b) is carried out in a blow moulding cavity (1), and wherein step c) is carried out in a separate thermoforming cavity (3), and wherein the intermediate container (8) is transferred from the blow moulding cavity (1) to the thermoforming cavity (3) between these two steps.

8. The process according to claim 7 wherein the intermediate container (8) is reheated between step b), the stretch-blow moulding step, and step c), the thermoforming step.

9. The process according to claim 1 wherein the outer profile of the plug (5) corresponds to the interior profile of the concave gripping region.

10. The process according to claim 1 wherein the temperature of the finished container ejected from the mould cavity at step e) is below the glass transition temperature, $T_g$.

11. The process according to claim 1 wherein there is provided means for interlocking the opposing concave gripping regions against each other such as to substantially eliminate any relative movement when gripped.

12. The process according to claim 1 wherein the gripping region of the finished container comprises deep grip palm rest, x, (52); deep grip finger rest, y, (54); deep grip recess depth, z, (56).

13. The process according to claim 12 wherein the sum of x+2y+2z is greater than 107 mm.

14. The process according to claim 12 wherein the depth of the deep grip recess, z, (56) is greater than 20 mm.

* * * * *